(12) United States Patent
Gupta

(10) Patent No.: US 12,014,346 B2
(45) Date of Patent: *Jun. 18, 2024

(54) SMARTGLASSES-BASED AUTONOMOUS TRANSACTION PLATFORM

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,306

(22) Filed: Oct. 12, 2023

(65) Prior Publication Data

US 2024/0046239 A1 Feb. 8, 2024

Related U.S. Application Data

(63) Continuation of application No. 18/111,655, filed on Feb. 20, 2023, now Pat. No. 11,823,163, which is a continuation of application No. 17/168,420, filed on Feb. 5, 2021, now Pat. No. 11,615,393.

(51) Int. Cl.
G06Q 30/00 (2023.01)
G06F 1/16 (2006.01)
G06Q 20/32 (2012.01)

(52) U.S. Cl.
CPC ........... *G06Q 20/321* (2020.05); *G06F 1/163* (2013.01)

(58) Field of Classification Search
CPC .................................................. G06Q 20/321

USPC ......... 705/41, 1.1, 40, 39, 44, 67, 14.27, 30; 345/156, 520; 455/406

See application file for complete search history.

(56) References Cited

U.S. PATENT DOCUMENTS

2008/0052164 A1* 2/2008 Abifaker ............ G06Q 30/0601
  705/14.27
2017/0103440 A1* 4/2017 Xing ..................... H04W 12/06
2019/0286805 A1 9/2019 Law et al.

OTHER PUBLICATIONS

ProQuestDialogNPL Search History.*

* cited by examiner

*Primary Examiner* — John H. Holly
(74) *Attorney, Agent, or Firm* — Weiss & Arons LLP

(57) ABSTRACT

A method for utilizing smartglasses-enabled, autonomous, transfer technology, to execute a transferor to recipient transfer is provided. The method may include receiving, via hand gestures at the smartglasses, a mobile phone number of a target recipient. The method may also include transmitting the mobile phone number from the smartglasses to an entity associated with the transferor. The method may then determine a recipient identification number associated with the mobile phone number at the entity associated with the transferor, and, preferably then, communicating with a transfer gateway to initiate a payment between a transferor account number associated and the recipient identification number. The method may also include processing the transfer via the transfer gateway and transmitting a completion notification to a mobile device associated with the mobile number and to the smartglasses.

5 Claims, 8 Drawing Sheets

SMARTGLASSES-BASED AUTONOMOUS TRANSACTION PLATFORM

CROSS-REFERENCE TO RELATED APPLICATIONS

This application is a continuation of U.S. patent application Ser. No. 18/111,655, filed on Feb. 20, 2023, entitled SMARTGLASSES-BASED AUTONOMOUS TRANSACTION PLATFORM, which claims priority as a continuation from U.S. patent application Ser. No. 17/168,420, filed on Feb. 5, 2021, and issued as U.S. Pat. No. 11,615,393 on Mar. 28, 2023, entitled SMARTGLASSES-BASED AUTONOMOUS TRANSACTION PLATFORM.

FIELD OF TECHNOLOGY

Aspects of the disclosure relate to smartglasses. Specifically, this disclosure relates to processing transactions using smartglasses.

BACKGROUND OF THE DISCLOSURE

Smartglasses have become more common in recent years. For the purposes of this disclosure, smartglasses may be understood to mean wearable glasses that include one or more processors as well as other related components.

It would be desirable to provide a system that utilizes input received from smartglasses to perform a transaction.

It would be further desirable for the system to enable the smartglasses to receive user selections input via the smartglasses.

It would be yet further desirable for the system to enable the smartglasses to perform the transaction absent contact with a second device—i.e., in an autonomous fashion.

SUMMARY OF THE DISCLOSURE

A system, or platform for communication is provided. The system, or platform, preferably includes a smartglasses device.

The system may include a smartglasses device. For the purposes of this disclosure, smartglasses may be understood to mean wearable glasses that include one or more internal processors. The one or more internal processors may include one or more microprocessors.

In addition to the processors, smartglasses may also include hardware components associated with conventional glasses. Such components may include a frame and lenses.

One or more software modules may execute on the processors. The one or more software modules may be stored in a memory located within the smartglasses. The one or more software modules may, in the alternative, be referred to as applications. The applications may enable the smartglasses to execute various tasks.

In addition to software modules, smartglasses may also include a display. In one embodiment, the smartglasses display may be physically configured to add data alongside what the wearer sees through the lenses. In some embodiments, the smartglasses display may display data as an at least partially transparent overlay on top the lenses. As such, the user may view, through the overlay, the physical objects that are normally seen through lenses. Such a smartglasses display may be known as an augmented realty smartglasses display.

The display included in the smartglasses may be constructed using organic light emitting diode ("OLED") technology. OLED technology may enhance functionality of a smartglasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

Another component of smartglasses may include the ability for smartglasses to modify its optical properties, such as tint and prescription of the lenses, at any given time. Smartglasses may change optical properties of the lenses by executing one or more software modules on the internal processors.

Smartglasses may also include one or more communication transceivers. The communication transceivers may be operable to communicate with external processors. The external processors may be included in a mobile device or any other computing device.

The smartglasses module may authenticate the user of the smartglasses. The authentication may be executed at an authorization controller module included in the smartglasses. The authorization controller module may authenticate the user based on a group of detected user behavioral characteristics. The group of detected user behavioral characteristics may include gait, speed, voice detection, head movements and body movements.

The interactive transfer interface may also be referred to as a screen operable to be displayed on a smartglasses device. The screen may include selectable options. The selectable options may be selected by hand gestures.

The smartglasses may receive a hand gesture-based command. The hand gesture-based command may be received from the user. The hand gesture-based command may be a swipe, tap or any other suitable command.

The smartglasses may be adapted to, using a voice command module, receive a user's voice command. The voice command module may be used, together with artificial intelligence (AI), to receive and adapt a voice library to store a user's voice expressions. The expressions may then be used to operation the smartglasses.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
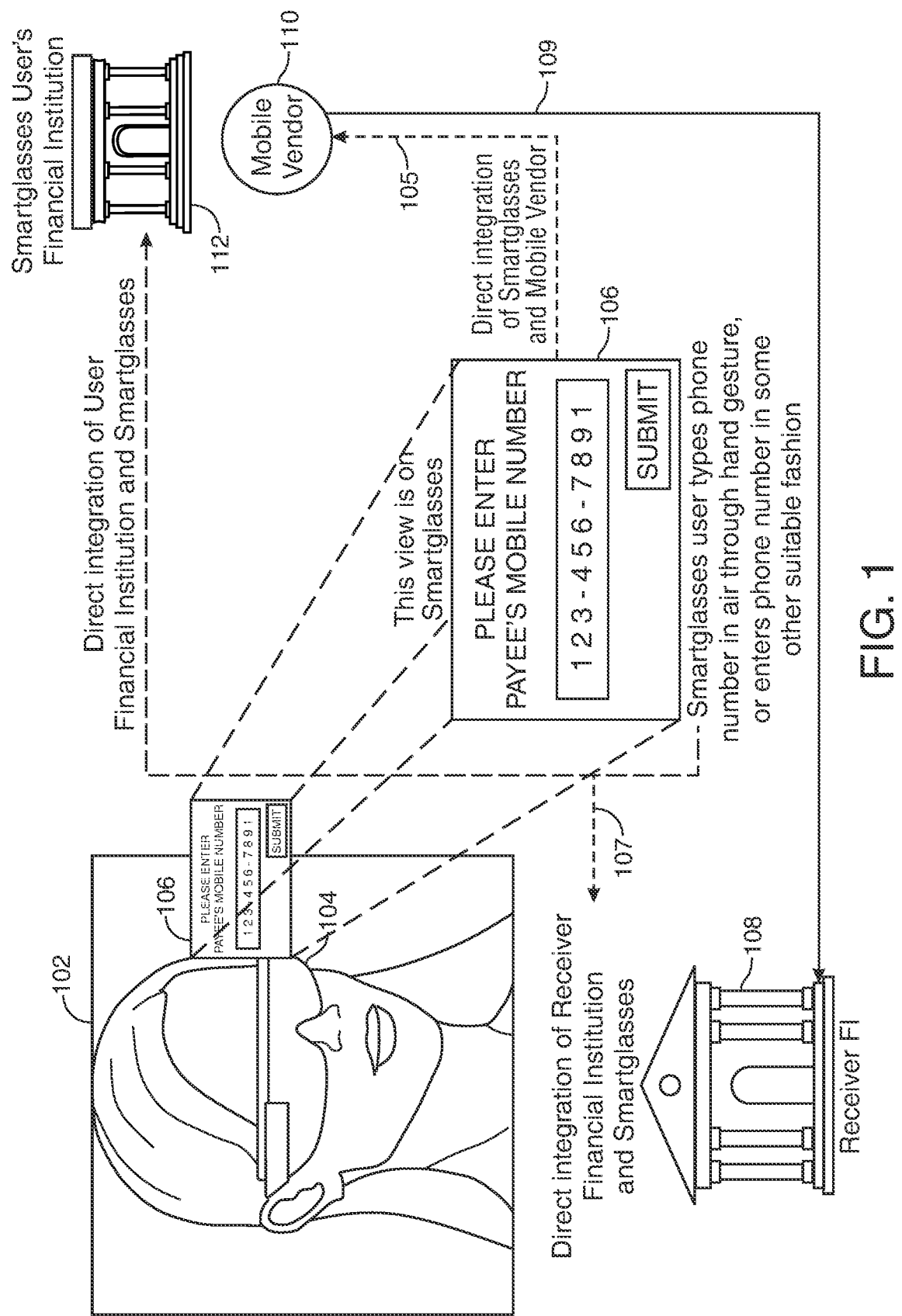
FIG. 1 shows an illustrative diagram in accordance with principles of the disclosure.

One new technology which is currently being underutilized is smartglasses technology. Smartglasses have the advantage that they typically remain on the user's person. In addition, they are a very compact device which can be leveraged to provide an interface between humans and other technologies.

Currently, smartglasses cannot directly be used to transfer funds, absent another contributing consumer electronic system, to a third party.

One embodiment of the current disclosure enables smartglasses to directly transfer funds, or other value, to another party. Such transfer may include using a registered mobile number associated with a third party. By gesturing in the air in such a way as to indicate the registered mobile number of the transferee in front of the glass, a transfer or other suitable transaction may be initiated.

A more particular embodiment of the invention involves enabling contact with a financial institution or other intermediary that may serve at least some of the functions of the financial institution. Preferably, such contact can be achieved independent of any involvement with any mobile device, laptop device, desktop device and/or apps stored therein—other than the smartglasses themselves. Such an approach to value transfer may disrupt the value transfer industry.

Further, technology in the disclosed embodiments may enable smartglasses to receive hand signals corresponding to the mobile number of the transferee. Such hand signals may be detected using some type of visual recognition hardware and software vis-à-vis user hand signals. These embodiments preferably eliminate the need to involve any additional mobile device or consumer device other than the smartglasses, to make the payment.

The disclosed technology enables smartglasses to connect to financial institutions such as banks and the like. The connection enables the smartglasses to identify a financial institution with which the transferee's mobile number is primarily associated.

Then, the disclosed technology may be configured to connect to a payment gateway of the identified financial institution to directly effectuate payment.

The disclosed technology preferably enables an additional benefit. In certain embodiments, smartglasses may preferably enable a user to transfer value to anyone independent of having to add that person as the beneficiary in their bank account. Rather, the value may be transferred directly to the bank account with which the mobile number of the transferee is associated.

The disclosed technology may also, in certain embodiments, enhance smart glasses by equipping them with heretofore unavailable integration software and/or hardware components. This integration software and/or hardware components may directly communicate with a payment or transfer gateway and, preferably thereafter, to a financial institution gateway.

In certain embodiments the disclosed smartglasses technology may enable a three-way communication system—preferably effective between multiple channels. For example, such technology may provide a platform for communication between smartglasses, a mobile vendor and one or more financial, or other types of, institutions.

After receiving the mobile number from the transferee, a mobile vendor may be integrated into the communication into two steps as follows. The first step of the integration of the mobile vendor may preferably involve receiving the mobile number of the transferee at the financial institution preferably associated with the smartglasses. This mobile number may be derived, in some way, from the mobile number vendor of the transferee.

In some embodiments, the smartglasses, or the financial institution associated with the smartglasses, can then use a mobile number resolver to determine the financial institution associated with the mobile phone of the transferee. As such, the user of the smartglasses can provide to the financial institution associated with the smartglasses the mobile number of the transferee. Thereafter, the financial institution associated with the smartglasses can use a phone-to-bank resolver to determine the financial institution associated with the mobile phone of the transferee. The phone-to-bank resolver, together with the FI associated therewith, may identify bank account information associated with a phone number.

In a second embodiment, the determination of the recipient account may involve direct participation of the mobile phone vendor as follows. The financial institution can query the mobile phone vendor to determine whether the mobile phone vendor has access to, and permission to retrieve and release, the financial institution, and account information, associated with the transferee. This information may be information that the mobile phone vendor derived from transactions with the transferee.

Additionally, this may be information that the mobile phone vendor derived through some other suitable method.

In any case, the financial institution associated with the smartglasses can preferably use the information retrieved from the mobile phone vendor to complete the transfer of value to the transferee.

Once confirmed, the financial institution associated with the transferee can receive the transfer on behalf of the transferee.

In yet a third method, the user of the smartglasses can directly access the financial institution associated with the transferee using the mobile number of the transferee. Thereafter, the financial institution associated with the transferee can use a phone-to-bank resolver to identify bank account information of the transferee.

Unlike the first method, but similar to the second method, this method preferably determines the financial institution associated with the transferee independent of mobile phone vendor involvement. Once confirmed, the financial institution associated with the transferee can receive the transfer on behalf of the transferee.

The smartglasses application may include an entity product scanner. The entity product scanner may be operable to identify an entity associated with the depository accounts.

The entity product scanner may be configured to read an interface configured to receive inputs provided by a user—such as hand gestures or other user actions.

The smartglasses application may include an entity communication module. The entity communication module may be operable to communicate with the smartglasses application. The communication between the entity communication module and the smartglasses application may be based on the entity identified by the entity product scanner by a user selected or by a system default.

The smartglasses application may also include a user information controller. The user information controller may be operable to interface with an external database associated with a financial entity. The user information controller may also be operable to maintain user account data in a smartglasses-based database.

The smartglasses application may also include an authorization controller related to the smartglasses user account information. The authorization controller may be operable to authenticate a user of the smartglasses. The authorization controller may be operable to transmit authentication data to the smartglasses application. The authorization controller may be operable to receive an authorization response from the smartglasses application.

The smartglasses application may also include a hand gesture controller. The hand gesture controller may be operable to receive hand gesture-based command from the user of the smartglasses.

The smartglasses application may also include an interactive transfer interface. The interactive transfer interface may be displayable on a display of the smartglasses. The interactive transfer interface may be operable to receive user selections via the hand gesture controller.

The smartglasses application may also include a front façade module. The front façade module may be operable to interface between the entity product scanner, the entity1 communication module, the user information controller, the authorization controller, the hand gesture controller and the interactive transfer interface.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. In segment 102, a user is shown wearing smartglasses 104. Smartglasses 104 may include one or more microprocessors, one or more displays, one or more cameras for capturing photographs and/or videos, one or more audio input devices, one or more audio output devices and/or one or more wired and/or wireless communication modules (e.g., Bluetooth®, Beacon®). The display may display information alongside what the user sees through the lenses. View 106 shows what the user is currently viewing on the display.

The communication module, included in smartglasses 104, may include multiple modes. The modes may include discoverable mode and non-discoverable mode. In a discoverable mode, the smartglasses may be actively searching for devices. In a non-discoverable mode, the smartglasses may not be actively searching for devices.

Smartglasses 104 may be set to discoverable mode. As such, smartglasses 104 may "discover" devices or networks in the vicinity that enable communication with receiver FI 108. A vicinity may be determined by a predetermined radius surrounding smartglasses 104.

Smartglasses 104 may be in communication with and/or integrated with a mobile services vendor 110. Smartglasses 104 may send a communication to such a vendor for further transmission. The communication may be a pairing communication for use with an FI-administered device and/or network. Upon authorization, the pairing communication may link smartglasses 104 to the device and/or network. As such, smartglasses 104 may be identified as the initiator in the communications between the device and/or network and smartglasses 104.

In some embodiments, the device and/or network associated with FI 108 and/or mobile vendor 110 may discover smartglasses 104. In such embodiments, the device and/or network associated with FI 108 and/or mobile vendor 110 may initiate communication with smartglasses 104.

The device and/or network associated with FI 108 and/or mobile vendor 110 may transmit a pairing communication to smartglasses 104. As such, the device and/or network associated with FI 108 and/or mobile vendor 110 may be identified as the initiator in the communications with smartglasses 106. It should be appreciated, that a communication participant may be identified as the initiator at the outset of a communication. However, during the communication, the communication participant may act as both initiator and recipient during the communication.

To reiterate, it should be noted that FIG. 1 preferably indicates three different embodiments for executing a transfer as set forth herein. First—FIG. 1 shows, at 103, transmitting the mobile number of the transferee to the financial institution associated with the smartglasses. The financial institution associated with the smartglasses can use the mobile number resolver to determine the financial institution associated with the mobile phone of the transferee and then complete the transfer. Second—FIG. 1 shows, at 105, that the mobile phone vendor can be directly queried to determine whether the mobile phone vendor has access to, and permission to retrieve and release, the financial institution, and account information, associated with the transferee. This information may be information that the mobile phone vendor derives from transactions with the transferee.

Finally, the user of the smartglasses can directly access the financial institution associated with the transferee using the mobile number of the transferee, as shown at 107. Thereafter, the financial institution associated with the transferee can use a phone-to-bank resolver to identify bank account information of the transferee.

Figure 2:
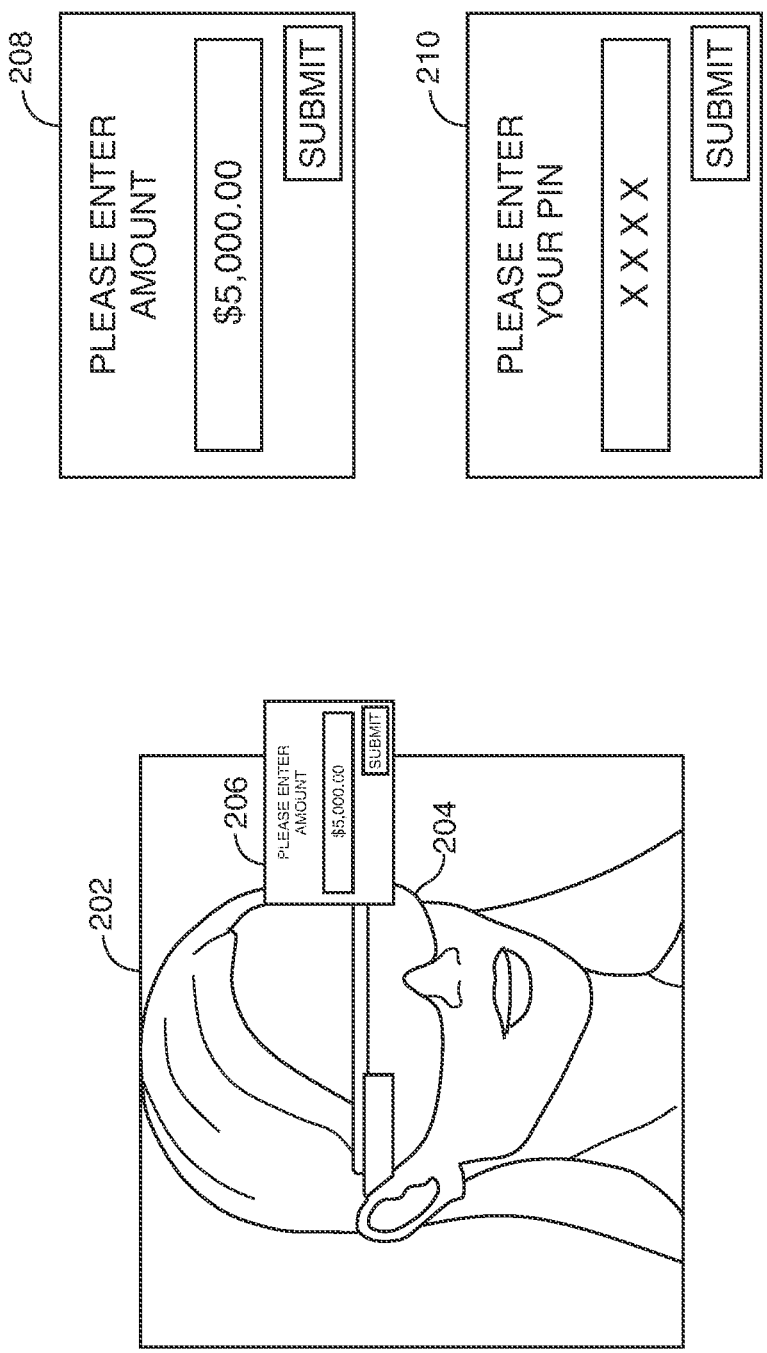
FIG. 2 shows another illustrative diagram in accordance with principles of the disclosure.

FIG. 2 shows an illustrative diagram. In segment 202, a user wearing smartglasses 204 may be in the middle of an autonomous communication. The communication may have been authenticated and/or authorized, as discussed above.

During the communication, smartglasses 204 may display interactive graphical user interface ("GUI") 206. Smartglasses 204 may run one or more operating systems specific to smartglasses 204.

Smartglasses 204 may be operable to receive commands from a user. The commands may be received in different ways. For example, the commands may be received from the user via touch gestures to one or more dynamic or static buttons on a viewable and actionable display associated with smartglasses 204. The commands may also be received from the user via touch gestures to one or more portions of the frames of smartglasses 204. Touch gestures may include swiping, pressing, tapping and squeezing. Touch gestures may also include a pattern of any of the above-mentioned gestures.

The commands may also be received from air-based hand and/or body gestures. Air-based hand and/or body gestures may be performed by the user's hand or body without specifically touching smartglasses 204. Various sensors, such as an accelerometer, gyroscope and touch pad may sense the hand and/or air gestures. Upon sensing the hand and/or air gestures, the sensor(s) and/or associated processors may translate the hand and/or air gestures into commands. The commands may be based on a command structure received from an external processor. The command structure may be a payment structure. Smartglasses 204 may transmit the identified commands to a device and/or network associated with FI 108, FI 112 and/or mobile vendor 110 (both shown in FIG. 1).

Screen 208 shows a screen populated with an autonomous transfer amount. Once the user is satisfied with the autonomous transfer amount shown in screen 208, the user may press, or otherwise indicate, submit to effectuate an autonomous transfer regarding same. Such a transfer may prompt entry of security information such as a personal identification number, encrypted biometric information, some combination of the foregoing, and/or any other suitable security and/or approval information suitable for protecting and/or authorizing the information received at, contained on, or transmitted from, smartglasses 204.

Following entry or other receipt of security information, the user may again be prompted to complete the autonomous transfer set forth in screen 208.

Figure 3:
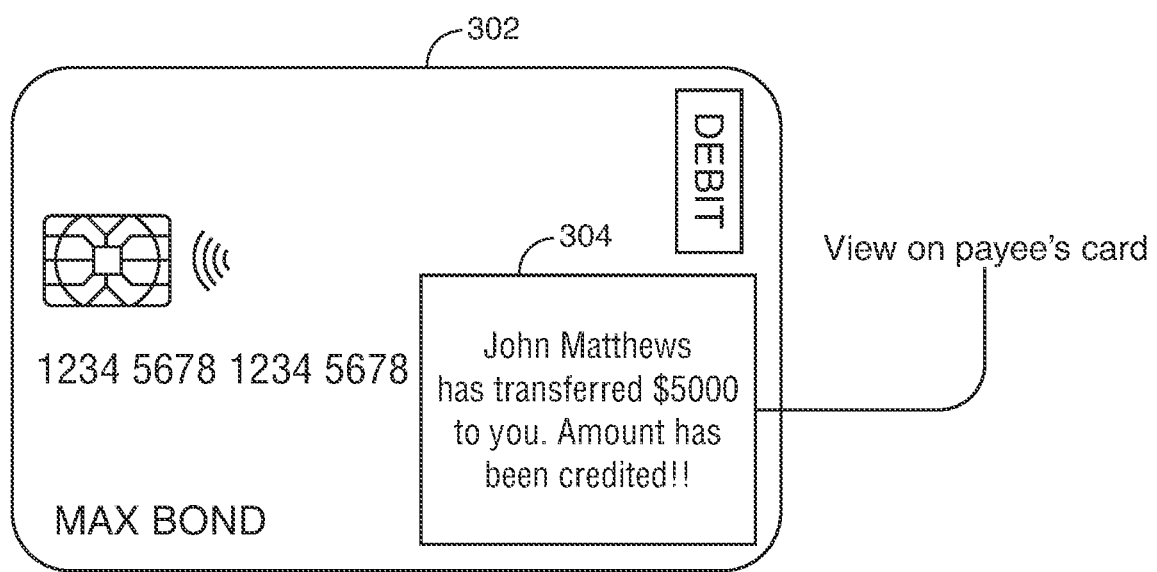
FIG. 3 shows yet another illustrative diagram in accordance with principles of the disclosure.

FIG. 3 shows an illustrative diagram of a dependent card 302 according to certain embodiments. Dependent card 302 is preferably associated with the transferee. Dependent card 302 may, in certain circumstances, be carried on the person of transferee.

Dependent card 302 may preferably include a screen 304. Following completion of the transfer, screen 304 may preferably display an indication that the transfer has occurred.

In some embodiments, screen 304 may indicate the ongoing status of the transfer. For example, screen 304 may indicate that the transfer has been initiated, the transfer is in process, the transfer has been completed, or any other suitable message associated with the ongoing, or completed, transfer.

Figure 4:
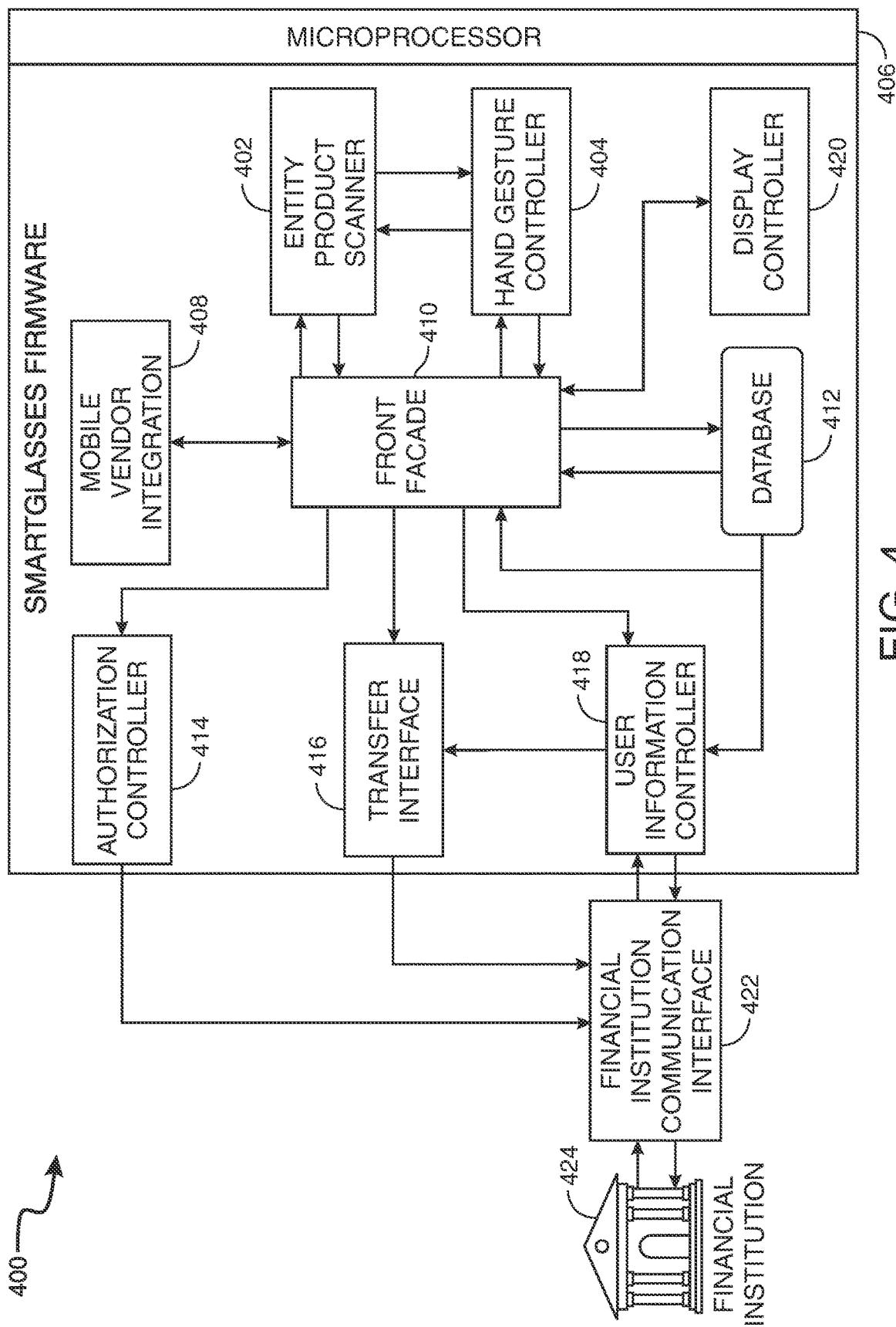
FIG. 4 shows an illustrative flow diagram in accordance with principles of the disclosure.

FIG. 4 shows an illustrative flow chart that involves a smartglasses device, components associated therewith, as well as entities associated therewith. The illustrative flow chart shows various components of an illustrative pair of smartglasses 400. The components of smartglasses 400 may be software components, hardware components or a combination of software and hardware components.

The smartglasses components may include authorization controller 414, mobile integration module 408, transfer interface 416, front façade 410, entity product scanner 402, hand gesture controller 404, authorization controller 414, user interface controller 418, optional database 412, microprocessor 406 and display controller 420.

Financial institution (FI) 424 is also shown. FI communication interface 422 may be a software/hardware module that is operated by FI 424. It should be noted that FI 424 could be the FI associated with transferor—i.e., the user of the smartglasses—or the FI associated with transferee or both.

Front façade 410 may be the front façade of the smartglasses. Front façade 410, and/or the hardware components formed therewithin or thereabout, may communicate with FI 424 using transfer interface 416. Transfer interface 416 may exchange information with FI 424 during an authenticated session between FI 424 and smartglasses 400.

In some embodiments, user interface controller may control information exchange with FI communication interface 422 either directly or through a user interface associated with FI communication interface 422. In some embodiments, transfer interface 416 may work together with user interface controller 418 to communicate with FI communication interface 422. In some embodiments transfer interface 416 may work separately from user interface controller 418 to communicate with FI communication interface 422.

Transfer interface 416 may include controls suitable for display on a screen. Transfer interface 416 may be displayable on a smartglasses operating system.

Front façade 410 may also communicate with an authorization controller 414. Authorization controller 414 may communicate with FI 424 to authenticate the wearer of the smartglasses.

Front façade 410 may also communicate with an entity product scanner.

Front façade 410 may also communicate with hand gesture controller 404. Front façade 410 may transmit hand gesture-based command data to hand gesture controller 404. The hand gesture-based command data may include a list of hand gestures and the interpretation for each hand gesture. For example, a swipe may be interpreted as a move from a first selection option to a second selection option. A double tap may be interpreted as a selection. Hand gesture controller 404 may read the hand gestures-based commands presented to front façade 410. Hand gesture controller 404 may receive data from entity product scanner 402.

Mobile integration module 408 may interface with front façade 410. Mobile integration module 408 may include functions for communication between front façade 410 and FI 424. As such, mobile integration module 408 may be imported into a memory, associated with smartglasses 400, to facilitate the communication between smartglasses 400 and FI 424. This communication may or may not be conducted via FI communication interface 422.

Front façade 410 may communicate with authorization controller 414. The communication between front façade 410 and authorization controller 414 may authenticate the communication between FI 424 and smartglasses 400 and the user thereof. Authorization controller 414 may include multiple authentication methods to authenticate smartglasses 400 and the user thereof.

In some embodiments, authorization controller 414 may authenticate the user by communicating directly with FI 424. The authentication communications between authorization controller 414 and FI 424 may include transmission of an account number, personal identification number, encrypted biometric information or any other suitable authentication information.

Upon a successful authentication of smartglasses 400 and/or the user thereof, data relating to the successful authentication communication may be stored in database 412. Front façade 410 may communicate a database 412. Database 412 may be located within smartglasses 400. Database 412 may also include stored information relating to communications between the smartglasses and FI 424. For example, the stored information may include entity information relating to the financial institution, user's bank account information and user's authentication information.

Microprocessor 406 may be used to control power provided the various components of the smartglasses 400. Such components, that are powered under the control of microprocessor 406, such as front façade 410, database 412, entity product scanner 402, hand gesture controller 404, mobile vendor integration module 408, authorization controller 414, transfer interface 416, user interface controller 418 and display controller 420. Microprocessor 406 may be linked to a memory and a battery.

Front façade 410 may also communicate with user interface controller 418. User interface controller 418 may retrieve bank account information associated with the user of smartglasses 400. In some embodiments, user interface controller 418 may communicate directly with the user to receive entry of an account number, or any other suitable data. Communications between user interface controller 418 and the user may include audio-based communications. As such, user interface controller 418 may be associated with one or more speakers, audio receptors and voice recognition modules. In some embodiments, user information controller 418 may communicate with an external device, such as a paired mobile device, to retrieve bank account information. Bank communication interface 422 may establish communication between user information controller 418 and bank 424.

Figure 5:
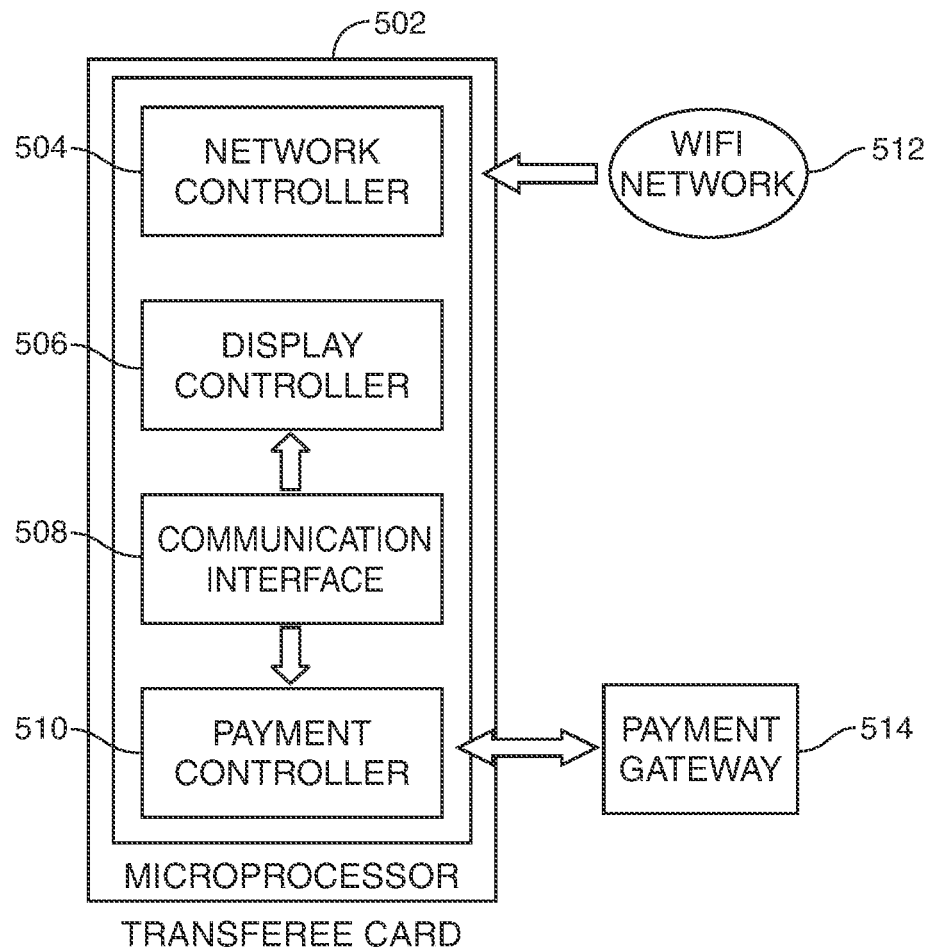
FIG. 5 shows another illustrative flow diagram in accordance with the principles of the disclosure.
Figure 6:
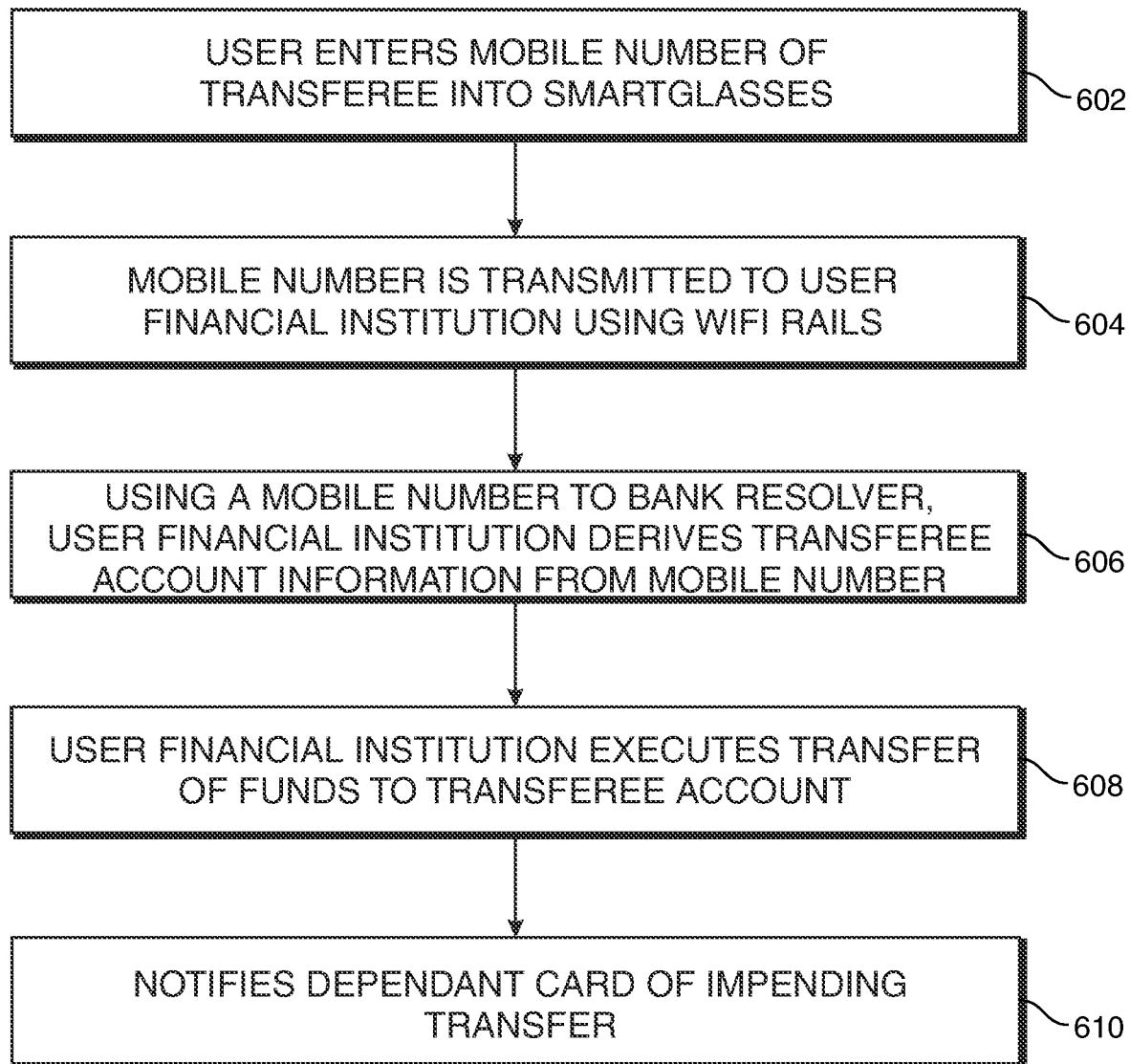
FIG. 6 shows yet another illustrative flow diagram in accordance with the principles of the disclosure.

FIG. 5 shows a transferee's card 502. Transferee's card 502 includes a microprocessor which operates to control a network controller 502, a display controller 504, a communications interface 506 and a payment controller 508. Transferee's card is adapted, via network controller 502, to communicate with a wifi network 512, and/or, via payment controller 510, a payment gateway 514. FIG. 6 shows still another illustrative flow diagram in accordance with the principles of the disclosure. The flow diagram in FIG. 6 shows a first process for implementing an autonomous transfer according to certain embodiments set forth herein.

At 602, a user can enter a mobile number of a transferee into smartglasses. At 604, the smartglasses may transmit the mobile number to a user FI. Such a transmission may preferably occur using Wifi rails or other suitable transmission medium.

Using a mobile number to bank resolver, as is known in the art, the user FI may then derive a transferee account information from the mobile number. This is shown at 606.

Once the user FI has derived the transfer information associated with the transferee, the user FI possesses sufficient information to execute a transfer of funds to the transferee account, as shown at 608.

Optionally, the process may include notifying a dependent card associated with the transferee of the impending transferee. This is shown at 610.

Figure 7:
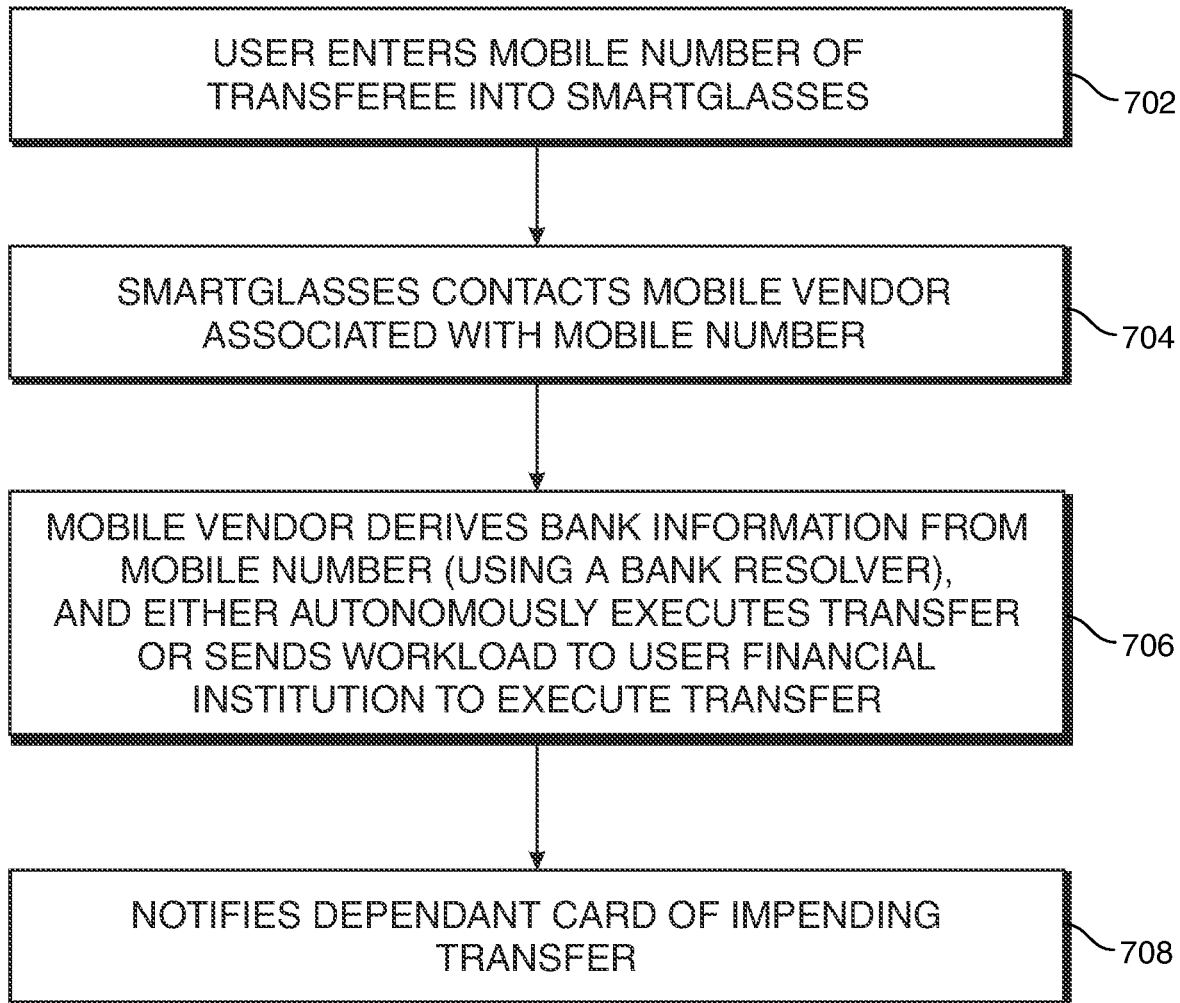
FIG. 7 shows still another illustrative flow diagram in accordance with the principles of the disclosure.

FIG. 7 is another illustrative flow diagram in accordance with the principles of the disclosure. FIG. 7 shows an alternative process for implementing an autonomous transfer according to the principles of the disclosure.

At 702, a user can enter a mobile number of a transferee into smartglasses. At 704, the smartglasses may transmit the mobile number to the mobile vendor associated with the smartglasses. Such a transmission may preferably occur using mobile phone rails, Wifi rails or other suitable transmission medium.

At 706, the mobile vendor may derive bank or other transfer information from the mobile number using a banking information resolver, as is known in the art, and either execute a transfer, or send a workload to a user FI to execute a transfer.

Again optionally, the process may include notifying, at 708, a dependent card associated with the transferee of the impending transferee.

Figure 8:
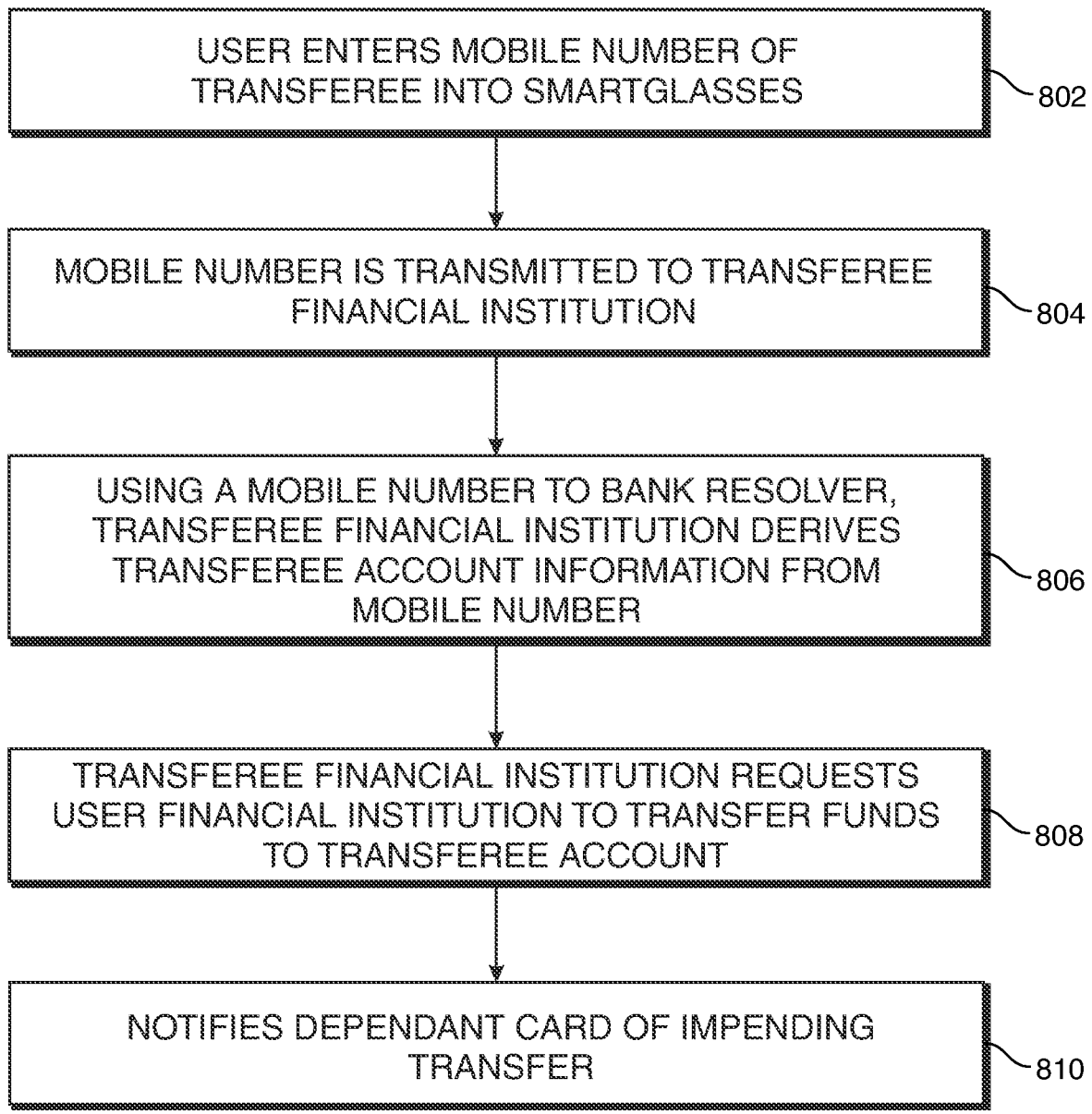
FIG. 8 is another illustrative flow diagram in accordance with the principles of the disclosure.

FIG. 8 is yet another illustrative flow diagram in accordance with the principles of the disclosure. FIG. 8 shows a process in which a user enters a mobile number of a transferee into the smartglasses. In response to same, at step 804, the process shows that a mobile number is transmitted to a transferee FI.

Using a mobile number to bank resolver, or other suitable device, the transferee FI may derive transferee account information from the mobile number.

At 808, the transferee FI may request that the user FI transfers funds in accordance with the information received with regards to the transfer.

Again optionally, at step 810, the process may include notifying a dependent card associated with the transferee of the impending transferee.

Thus, a smartglasses-based autonomous transaction platform is provided. Persons skilled in the art will appreciate that the present invention can be practiced by other than the described embodiments, which are presented for purposes of illustration rather than of limitation. The present invention is limited only by the claims that follow.

What is claimed is:

1. A method for utilizing smartglasses-enabled, autonomous, transfer technology, to execute a transferor to recipient transfer, the method comprising:
   receiving, via hand gestures at the smartglasses, a mobile phone number of a target recipient;
   transmitting the mobile phone number from the smartglasses to an entity associated with the transferor;
   determining a recipient identification number associated with the mobile phone number at the entity associated with the transferor;
   communicating with a transfer gateway to initiate a payment between a transferor account number associated and the recipient identification number;
   processing the transfer via the transfer gateway, said processing comprising instructing the entity associated with the transferor to perform the transfer; and
   transmitting a completion notification to a mobile device associated with the mobile number and to the smartglasses;
   wherein the smartglasses comprises an interactive transfer interface, said interface that comprises a screen operable to be displayed on the smartglasses, the screen comprising selectable options, the selectable options being selected by hand gestures.

2. The method of claim 1 further comprising authenticating the transferor to the smartglasses based on a group of detected transferor behavioral characteristics, said group of detected transferor behavioral characteristics being stored, exclusively, at the entity associated with the transferor.

3. The method of claim 2, wherein the group of detected transferor behavioral characteristics include gait, speed, voice detection, head movements and body movements.

4. The method of claim 1, further comprising:
receiving a responsive authentication communication from the transferor;
transmitting the responsive authentication communication to an external authenticator, said external authenticator located at the entity associated with the transferor; and
receiving an authentication signal from the external authenticator.

5. The method of claim 4, wherein the authentication signal comprises a Bluetooth® identifier.

* * * * *